March 19, 1935.   D. J. DOLAN ET AL   1,994,695
AUTOMOBILE RAILWAY CAR
Filed March 23, 1933
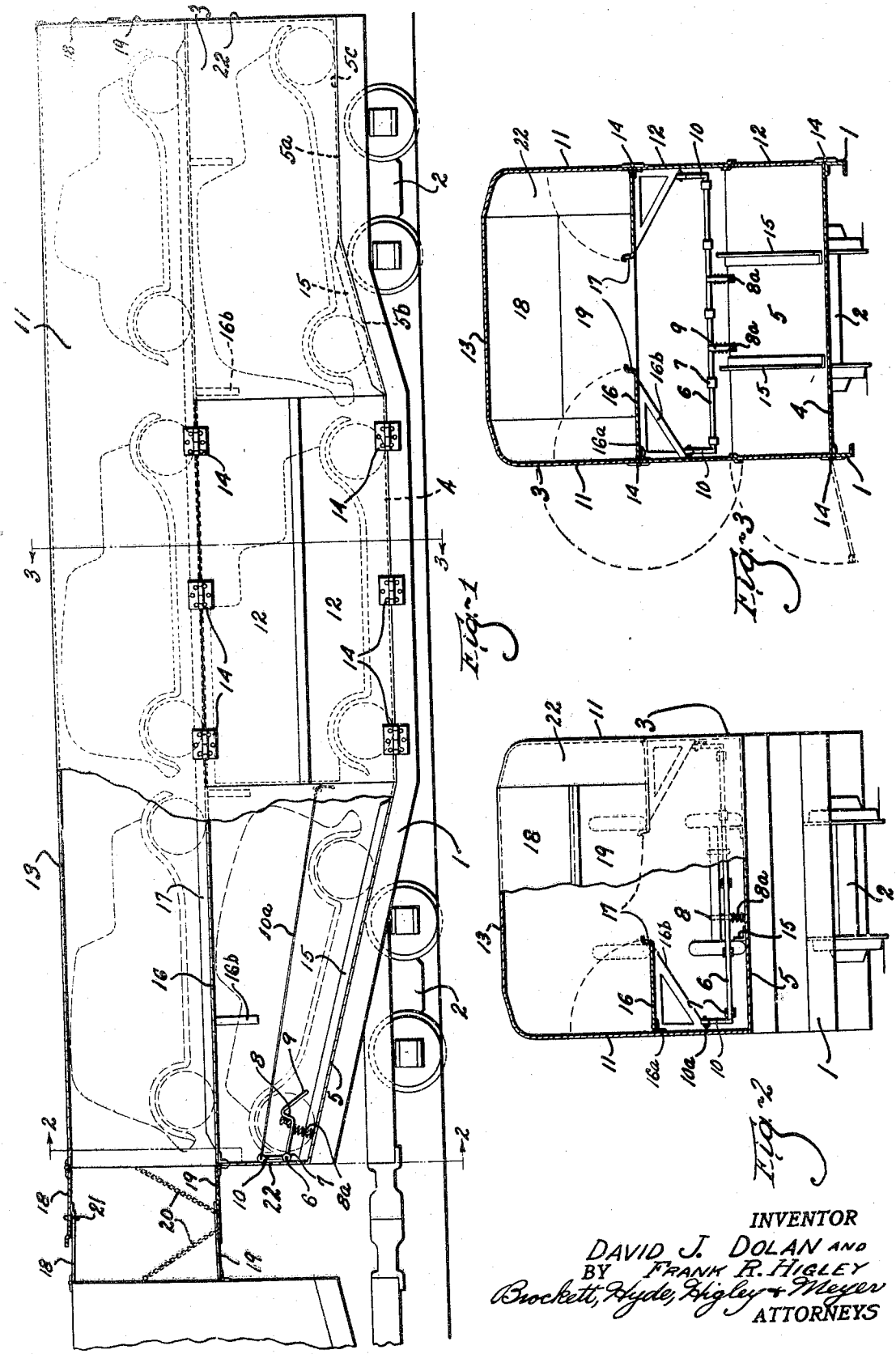
INVENTOR
DAVID J. DOLAN AND
BY FRANK R. HIGLEY
Brockett, Hyde, Higley + Meyer
ATTORNEYS Patented Mar. 19, 1935

1,994,695

UNITED STATES PATENT OFFICE 1,994,695

AUTOMOBILE RAILWAY CAR

David J. Dolan and Frank R. Higley, Cleveland Heights, Ohio, assignors to The Cardel Company, Inc., Chester, Pa., a corporation of Delaware Application March 23, 1933, Serial No. 662,300

3 Claims. (Cl. 105—368)

This invention relates to railway cars for transportation of automobiles.

The objects of the invention are to provide such a car which shall have a maximum carrying capacity in automobiles, for its length; and one having an arrangement of its parts wherein a maximum strength is had.

The exact nature of this invention together with further objects and advantages thereof will be apparent from the following description taken in connection with the accompanying drawing, in which Fig. 1 is a composite view generally in side elevation, conventionally and diagrammatically illustrating an embodiment of the invention, opposite ends of the car illustrating different modifications, a load of automobiles therein being indicated, and pertinent parts of another car, as coupled thereto, being shown; Figs. 2 and 3 are transverse sectional elevations as in the planes of lines 2—2, 3—3, respectively Fig. 1.

With reference now to the drawing, 1 conventionally illustrates the frame of the car, mounted upon the end trucks 2, and supporting the car body generally indicated at 3. The car body has sides 11, ends 22 and a top 13.

The body has a bottom deck with a low central section or panel 4 between the trucks 2, and end sections or panels 5, 5a, each leading from the central panel 4 and arranged to clear the near truck. As indicated at the left, Fig. 1, the end panel 5 is flat, with continuous slope upwardly from the central panel 4 to the end of the car. As indicated to the right, Fig. 1, the end panel 5a has a sloping part 5b leading upwardly from the central panel 4, to a level 5c.

In either event the end panels of the bottom deck clear their trucks, and are so proportioned and arranged as to support an automobile, with its rear wheels resting upon a slope, and either of the described and illustrated arrangements may be employed.

Obviously an automobile so positioned will tend to roll downwardly toward the central panel 4. To prevent this, latch securing means are provided. As conventionally illustrated in the drawing, such latch means may comprise a bar 6 mounted as a rock shaft in brackets 7 secured on the end of the car body and having hook means 8 with tongues 9 extending therefrom, springs 8a arranged to yieldably urge the hooks upwardly, and arms 10 extending upwardly from the extremities of the rock shaft 6 to limit the motion of the hooks 8 and serve as releasing actuators as will be described. The parts are so proportioned and arranged that the tongues 9 will cam their hooks 8 under and into engagement with an end part of an automobile moved from the central panel 4 to the position indicated. The hooks may be arranged to thus automatically engage the automobile front axles as illustrated. Obviously an automobile on the end panel 5 will be firmly secured by gravity against motion toward its end of the car, and by its hook means against motion in the opposite direction.

For unloading of the automobiles on the end panels of the lower deck, pull ropes, rods, or other lines 10a are run from the lever arms 10, along the sides of the body to convenient reach adjacent the side door openings. Thus, once the center panel 4 is unloaded, an operator on this panel need only pull one of these lines 10a to release an automobile from an end panel, whereupon the released automobile will roll by gravity down onto the central panel 4; whence it may be unloaded from the car through the open side.

Its sides 11 have openings providing access to the central panel 4 and preferably coextensive therewith lengthwise of the car. Doors 12 are provided for these openings. Although the doors 12 may be otherwise mounted they are shown as in pairs, hinged top and bottom as indicated at 14 to swing downwardly and outwardly from closed position as indicated Fig. 3 to provide a loading platform for the central panel 4 of the bottom deck.

Another possible side door arrangement is one wherein the door openings extend the full height of the car body side walls, and the doors are arranged to slide as in the ordinary box car. This arrangement is preferable in that the car may be used for transportation of bulky articles too large to be loaded onto the usual railroad box car.

The bottom deck may thus be loaded by moving the first automobile over the ramp provided by the near opened side door 12, and onto the low central panel 4, to a position directed to one end of the car. Suitable apparatus may be employed if necessary for the purpose. The automobile is then moved in its ahead direction up onto the corresponding end panel 5 where it is automatically latched in position as described. The next automobile is similarly positioned on the central panel 4 but heading in the opposite direction. It is then moved forwardly onto the other end panel 5 and there latched as before. Preferably the end panels are provided with spaced flanges 15 or similar guide means for the wheels of automobiles moved onto the panels, these guide means serving also to secure the latched automobiles against side shifting in transit. A third automobile is then loaded onto the central panel 4 and secured thereon against shifting in transit, by any convenient means.

The bottom deck of the car is then completely loaded and its doors 12 may be closed and secured.

The car body is provided with an upper deck 16 extending level the entire car length at height just sufficient to clear the load of automobiles on the bottom deck as indicated at Fig. 1; and the height of the top 13 of the body is just sufficient to clear automobiles on the deck 16. The deck is in two parts each extending inwardly from its side wall, with an upwardly extending lip 17 along its inner extremity, the proportions being such that the lips 17 will serve as automobile guides extending between the wheels thereof as indicated in the drawing. Also as indicated Figs. 2 and 3, each deck part is preferably mounted on its side wall to be removed or swung thereagainst, to make the entire space within the car body available without partitions when this is desired as for shipment of other goods than automobiles. The arrangement shown in the drawing for the purpose includes hinges 16a mounting the deck parts 16 for upward swinging motion, and brackets 16b for supporting the decks in lowered position, the brackets being removable or mounted to swing against the car sides when not in use.

Where the side door openings extend the full height of the car as in the optional arrangement already described, the decks 16 are made sectional so that those deck parts opposite the doorways may be removed.

The end walls of the car body have openings leading to the space between the deck 16 and the top 13. Upper and lower doors 18 and 19 are provided for these openings, hinged top and bottom, so that when the adjacent doors of a pair of coupled cars are opened as indicated at the left, Fig. 1, automobiles may be run from one car to the next over the lower end doors 19, the upper doors 18 clearing the automobiles and providing a roof for the passageway between cars. Suitable supports here conventionally indicated as chains 20, are associated with the lower end doors 19 to support them in open position. The upper doors 18 may be secured in open position in any convenient manner such as by folding back over the tops of their cars or by clips as conventionally indicated at 21.

It will be obvious that the upper deck 16 of the car is loaded through one of the end openings, and that in a train of such cars the entire upper deck may be loaded from an end of the train; it being merely necessary to provide a delivery platform of suitable height, with a ramp approach or the like, for the purpose. The upper deck may preferably be unloaded from the opposite end of the car.

In conclusion it may be observed that the described car arrangement lends itself to a construction of great strength. The side openings do not extend above the upper deck 16, and the end openings do not extend below this deck, so that the car body has inherent strength from the form of its sides and may be given any desired additional strength by very simple framing.

As to loading and unloading, either a single car or a train of cars may be loaded or unloaded on both decks simultaneously. By the described arrangement of the panels of the lower deck, an automobile of unusual height may be accommodated in the central panel 4 thereof, yet with present day automobile heights, the car may pass the present standard railroad clearances. Obviously, while the embodiment illustrated accommodates six automobiles, it could be made to accommodate eight or more by lengthening of the central panel 4. Similarly, for convenience in loading the lower deck, its central panel might be arranged as, or including, a turntable upon which the automobiles thereon could be rotated to assist in their loading and unloading as will be appreciated.

What we claim is:

1. In a railway car for transportation of automobiles, a car body mounted upon a pair of end trucks, said car body having a bottom deck with a low central section between said trucks and end section each extending upwardly from said central section and over the near truck, said body having an upper deck extending the length of the car over said bottom deck, said body having sides with central openings providing for side loading directly onto said central bottom deck section only and having ends with openings providing for end loading onto said upper deck, and being otherwise without loading openings, whereby a rigid body structure is had.

2. In a railway car for transportation of automobiles, a car body having an automobile supporting deck section with a slope, and a way of automobile approach to said section at the lower end thereof, and latch means arranged to automatically engage an automobile when the latter is positioned on said section, with a wheel on said slope, to releasably secure said automobile against motion down said slope.

3. In a railway car for transportation of automobiles, a car body mounted upon a pair of end trucks, said body having a bottom deck with a low central section between said trucks and end sections, each leading from said central section, with a slope arranged to clear the near truck and located to support a pair of wheels of an automobile on the end section, latch means associated with said car body and arranged to automatically engage a part of said automobile when the latter is so positioned, to secure the same against motion down said slope, said body having sides about said end sections with openings providing for side loading onto said central bottom deck section, and means associated with said latch means and arranged for actuation by an operator at said central section to cause automobile-releasing operation of said latch means.

DAVID J. DOLAN.
FRANK R. HIGLEY.